United States Patent [19]

Cox et al.

[11] Patent Number: 4,897,605

[45] Date of Patent: Jan. 30, 1990

[54] DEEP PENETRATION WELL LOGGING SYSTEM AND METHOD

[75] Inventors: Percy T. Cox; Wayne F. Warren; Donald L. Johnson, Jr., all of Houston, Tex.

[73] Assignee: Texaco Inc., White Plains, N.Y.

[21] Appl. No.: 840,370

[22] Filed: Mar. 17, 1986

Related U.S. Application Data

[60] Division of Ser. No. 579,316, Apr. 6, 1984, Pat. No. 4,622,518, which is a continuation of Ser. No. 480,638, Mar. 31, 1983, abandoned.

[51] Int. Cl.$^4$ .......................... G01V 3/10; G01V 3/18
[52] U.S. Cl. ..................... 324/341; 324/233
[58] Field of Search ............... 324/338–341, 324/366, 368, 233; 340/856, 857; 367/57, 75; 364/422

[56] References Cited

U.S. PATENT DOCUMENTS

| | | | |
|---|---|---|---|
| 3,388,325 | 6/1968 | Birdwell et al. | 324/339 X |
| 3,391,334 | 7/1968 | Ruehle | 324/338 X |
| 3,893,021 | 7/1975 | Meador et al. | 324/341 |
| 4,107,597 | 8/1978 | Meador et al. | 324/339 X |
| 4,107,598 | 8/1978 | Meador et al. | 324/341 |
| 4,185,238 | 1/1980 | Huchital et al. | 324/338 |
| 4,209,747 | 6/1980 | Huchital | 324/338 |
| 4,451,789 | 5/1984 | Meador | 324/338 |
| 4,594,551 | 6/1986 | Cox et al. | 324/341 |

OTHER PUBLICATIONS

Antonov et al, "Equipment for Dielectric Induction Logging", Geofiz. Apparatura, No. 26, 64–73 (1965).
Izv et al, "Dielectric Inducation Logging", Geol. Razved. 8, No. 11, 110–119 (1965).

Primary Examiner—Brian S. Steinberger
Attorney, Agent, or Firm—Robert A. Kulsason; James J. O'Loughlin; Ronald G. Gillespie

[57] ABSTRACT

A well logging system and method of the present invention determines the dielectric constant and/or conductivity of earth formations some of which have fluid invasion. The system and method of the present invention includes the transmission of electromagnetic energy into the earth formation from a first location in a borehole in the formations at a frequency which enables the electromagnetic energy to propagate throughout the surrounding earth formations. Electromagnetic energy is received by receivers at three locations in the borehole which are spaced longitudinally from the location of the transmission of the electromagnetic energy. The receivers provide signals representative of the total electromagnetic fields at those locations. The dielectric constant and/or resistivity of the earth formations are determined in accordance with portions of the signals from the three receivers corresponding to secondary electromagnetic fields at the three receiving locations.

6 Claims, 2 Drawing Sheets

A. CONVENTIONAL SYSTEM
B. SHORT RATIO LONG PHASE SYSTEM
C. SHORT SFR LONG PHASE SYSTEM 4,897,605

DEEP PENETRATION WELL LOGGING SYSTEM AND METHOD

CROSS REFERENCE TO RELATED APPLICATIONS

This is a division, of application Ser. No. 579,316, filed Apr. 6, 1984, now U.S. Pat. No. 4,622,518, which is a continuation as to all subject matter common to U.S. application Ser. No. 480,638, filed on Mar 31, 1983 now abandoned by Percy T. Cox, Wayne F. Warren and Donald L. Johnson, Jr. and assigned to Texaco Inc., assignee of the present invention; and a continuation-in-part for all additional subject matter.

BACKGROUND OF THE INVENTION

Field of the Invention

The present invention relates to dielectric constant and/or conductivity well logging systems and methods in general and, more particularly, to well logging systems and methods for determining the dielectric constant and/or resistivity of earth formations some of which have been invaded by drilling fluid.

SUMMARY OF THE INVENTION

A well logging system and method of the present invention determines the dielectric constant and/or conductivity of earth formations some of which have fluid invasion. The system and method of the present invention includes the transmission of electromagnetic energy into the earth formation from a first location in a borehole in the formations at a frequency which enables the electromagnetic energy to propagate throughout the surrounding earth formations. Electromagnetic energy is received by receivers at three locations in the borehole which are spaced longitudinally from the location of the transmission of the electromagnetic energy. The receivers provide signals representative of the total electromagnetic fields at those locations. The dielectric constant and/or resistivity of the earth formations are determined in accordance with portions of the signals from the three receivers corresponding to secondary electromagnetic fields at the three receiving locations.

The objects and advantages of the invention will appear more fully hereinafter from a consideration of the detailed description which follows, taken together with the accompanying drawings, wherein one embodiment of the invention is illustrated by way of example. It is to be expressly understood, however, that the drawings are for illustration purposes only and are not to be construed as defining the limits of the invention.

DESCRIPTION OF THE INVENTION

The problem of investigating underground formations from a borehole in which there is a zone in the formation by a drilling fluid and a non-invaded zone in the formation, has been discussed in U.S. Pat. No. 4,185,238. That patent discloses a dielectric and resistivity well logging system utilizing a transmitter coil with four receiver coils spaced longitudinally from the transmitter coil and having spacings of twenty-seven inches, fifty-two inches, seventy-five inches and one hundred inches from the transmitter coil.

U.S. Pat. No. 4,594,551, which issued June 10, 1986, describes a one transmitter - three receiver coil system which accomplishes substantially the same information as the aforementioned patent but with fewer elements. This system is referred to as the short ratio, long phase system.

Figure 1:
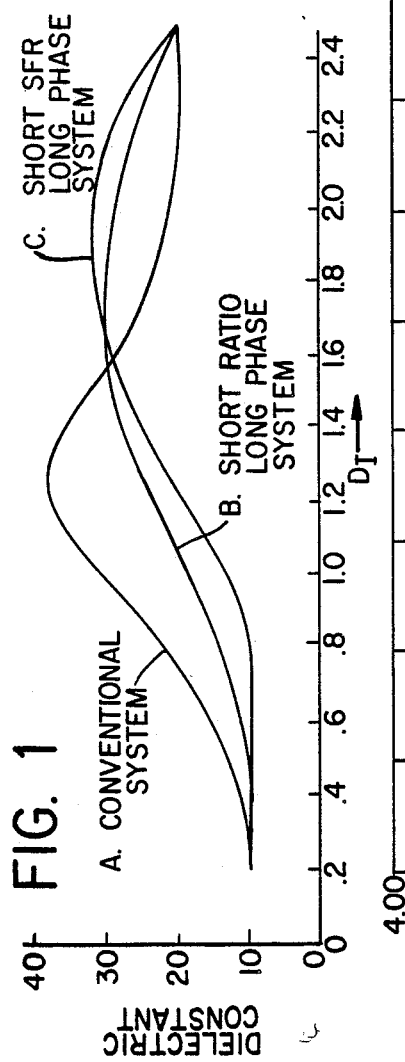
FIG. 1 is a plot of the response of a well logging tool constructed in accordance with the present invention along with the response of the well logging tool of a conventional system and the response of a short ratio, long phase well logging system.

The short ratio, long phase system may be improved upon to increase the depth of investigation, as shown in FIG. 1, by making a secondary field ratio (SFR) measurement in place of the total field amplitude ratio commonly used. The total field signals at each receiver coil consist of contributions from both a primary and a secondary electromagnetic field. The primary field is that part of the received signal which results directly from the electromagnetic field generated by the transmitter coil. The transmitted electromagnetic field also excites eddy currents in the surrounding formation. These eddy currents consist of both conductive and displacement currents. The displacement current density is proportional to the dielectric constant of the surrounding material, while the conductive current density is proportional to the conductivity of the surrounding material. Both the conductive and displacement currents are themselves a source of an electromagnetic field, which is called the secondary field.

The present invention determines the primary field with the sonde located in air and then uses this signal to cancel out the primary field part of the total field so that only the secondary field is being measured. The results of this technique are shown in FIG. 1 and it can be seen that this method is considerably less affected by invasion than the aforementioned short ratio, long phase system.

Figure 2:
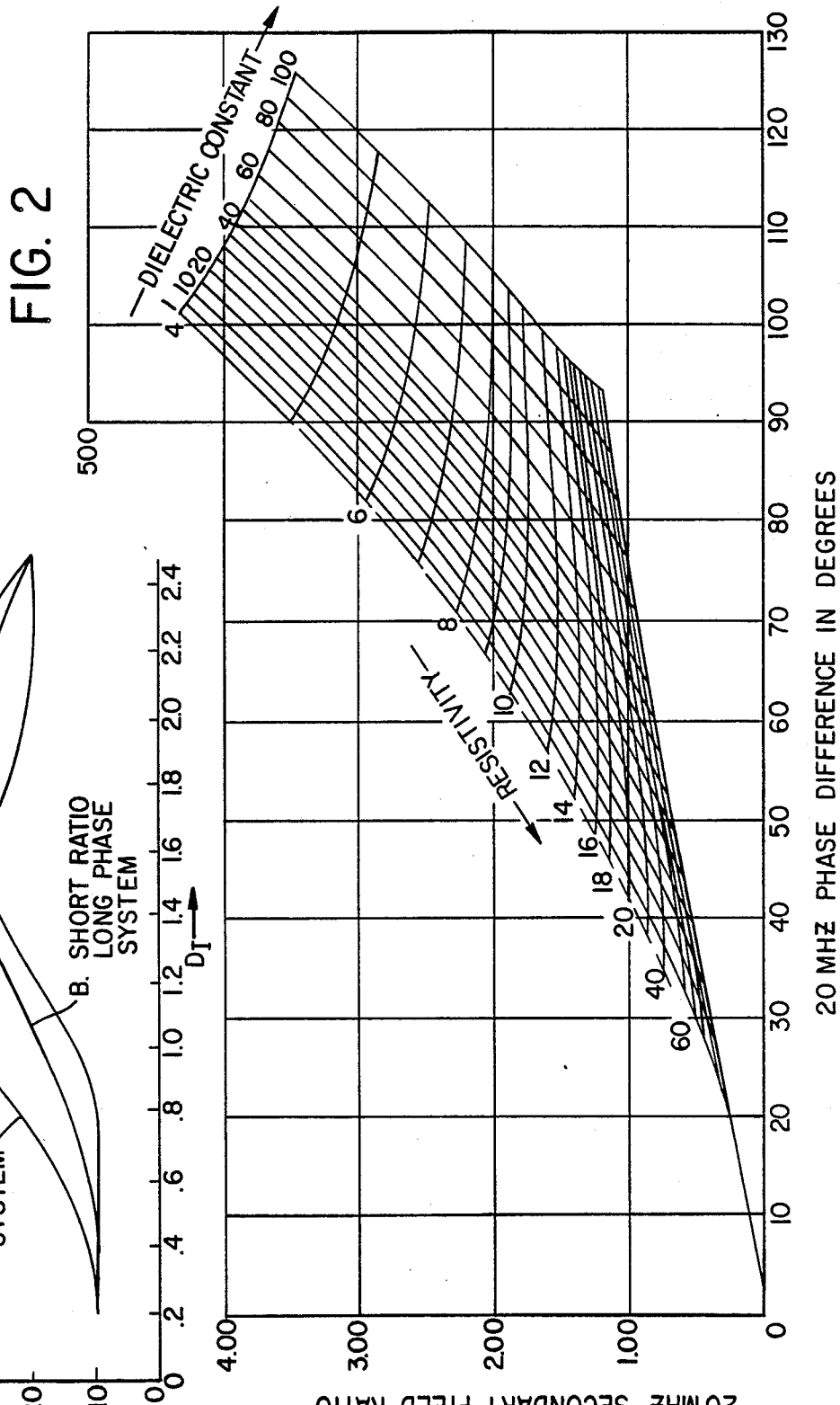
FIG. 2 is a graphical plot of secondary field ratio versus phase difference for a well logging system constructed in accordance with another embodiment of the present invention.

A plot utilizing the short-spaced secondary field ratio, long-spaced phase method is shown in FIG. 2. This plot relates the 20 megahertz secondary field ratio and the 20 megahertz phase difference measurements to the formation resistivity and dielectric constant values.

Figure 3:
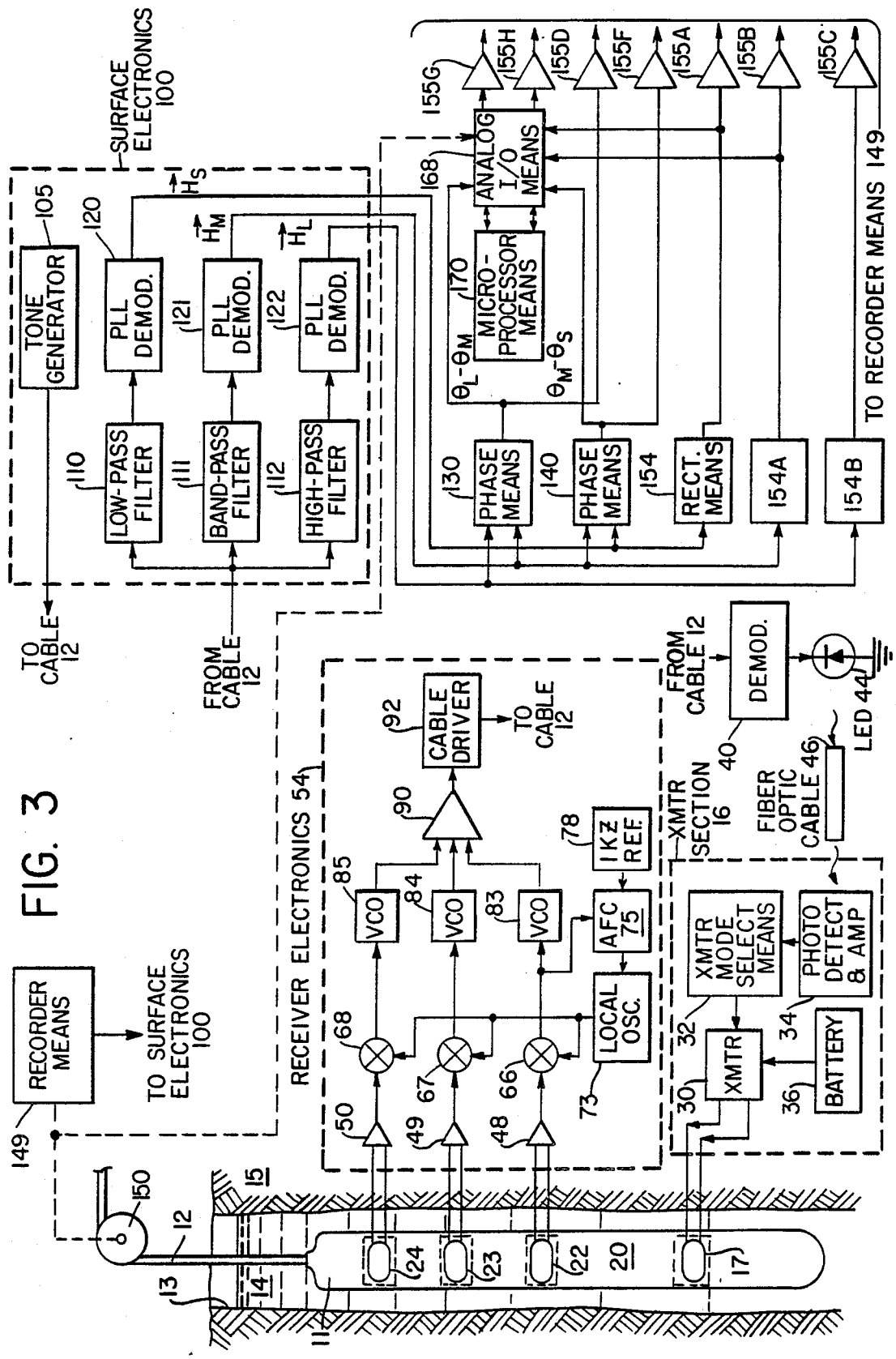
FIG. 3 is a simplified block diagram of a short ratio, long phase well logging system constructed in accordance with the present invention.

Referring now to FIG. 3, a well logging sonde 11 whose main body member is preferably constructed of fiberglass or some other non-conductive material of sufficient strength characteristics, is shown suspended by a well logging cable 12 in an uncased well borehole 13 filled with borehole fluid 14 and is surrounded by earth formations 15 whose dielectric constant and resistivity properties are to be measured. Within the lower portion of the well logging sonde 11 is housed a transmitter electronic section 16 and an associated transmitting coil 17. Transmitting coil 17 is wire wound on a non-conducting machinable ceramic material. Transmitting coil 17 is energized at a frequency in the range of 10 to 60 megahertz (preferably at a frequency of 20 megahertz) as hereinafter described, to transmit electromagnetic energy into earth formations 15. Receiver coils 22, 23 and 24 which are helically wound on machinable ceramic forms comprise tuned resonant circuits which are sensitive to the transmitting frequency. Receiver coils 22, 23 and 24 are located 24, 40 and 56 inches, respectively, from transmitter coil 17 in sonde 11. Transmitter coil 17 and receiver coils 22, 23 and 24 are electrostatically shielded as indicated by the dotted line boxes around the coils. The coil spacings just recited are intended as being illustrative only and it will be appreciated by those skilled in the art that other operating frequencies in the range of interest for practicing the invention and other coil spacings than these may be used without departing from the inventive concept.

Transmitter section 16 includes a transmitter 30 which may be in an off state, a low power operational state, or a high power operational state as determined by an operator. Transmitter 30 is used to energize transmitter coil 17. Transmitter section 16 includes also transmitter mode select means 32 which provides a control signal to transmitter 30, to control the state of transmitter 30, in response from a signal from a photo detector and amplifier 34. Transmitter 30 is energized by DC voltage from battery 36. An operator at the surface determines the transmitter mode and provides, as hereinafter explained, a modulated signal down well logging cable 12 to a demodulator 40 located in the upper section of sonde 11 which demodulates the signal and provides it to a light emitting diode 44. Light emitting diode 44 provides a corresponding light output through a fiber optic cable 46 which passes through the coils 17, 22, 23 and 24 and is then converted back into an electrical signal by photo detector and amplifier 34 located in transmitter section 16. The purpose of using fiber optic cabling is to allow the state of transmitter 30 to be controlled without creating electromagnetic interference in receiver coils 22, 23 and 24.

The signals from coils 22, 23 and 24 are provided to amplifiers 48, 49 and 50, respectively, of receiver electronics 54. The outputs of receivers 48, 49 and 50 are provided to RF mixers 66, 67 and 68, respectively, where the receiver signals are heterodyned to a lower frequency preferably 1 kilohertz by action of a local oscillator 73. An automatic frequency control circuit 75 maintains the intermediate frequency locked to a frequency of 1 kilohertz reference signal provided by a 1 kilohertz reference source 78. The outputs of mixers 66, 67 and 68 are provided to voltage controlled oscillators 83, 84 and 85, respectively, which converts the mixers' signals to frequency modulated signals.

Voltage controlled oscillators 83, 84 and 85 provide frequency modulated signals having carrier frequencies of 20, 45 and 86 kilohertz, respectively. These carrier frequencies were chosen to provide adequate separation of the modulated carriers to allow for low pass, high pass and band pass filtering at the surface and further to fall within the maximum transmission capability of the logging cable. The frequency modulated signals provided by voltage controlled oscillators 83, 84 and 85 are provided to summing amplifier means 90 where they are summed and provided to a cable driver 92. Cable driver 92 provides the sum signal from summing means 90 to cable 12 which conducts it uphole to the surface electronics 100 on the surface.

As noted earlier, transmitter 30 may be in any one of three states. The transmitter operational state is selected at the surface to allow high power operation of transmitter 16 only while actual logging and calibrations are in process. This permits the standard battery pack to operate within its power capabilities while providing a factor of 10 increase in transmitter input power during logging. Transmitter 30 state is selected by sending a dual tone signal from tone generator 105 of surface electronics 100 to cable 12 where it is conducted downhole to demodulator 40 in sonde 11. As explained previously in the discussion of transmitter section 16, the signals are then conveyed to photo detector 34 via fiber optic cable and thence to transmitter mode select 32 which controls the mode of transmitter 30.

Surface electronics 100 also includes a low pass filter 110, a band pass filter 111, and a high pass filter 112 which filters the signal from cable 12 to provide reproduction of the signals from voltage control oscillators 83, 84 and 85, respectively, to phase locked loop demodulators 120, 121 and 122, respectively. The output of phase locked loop demodulators 120, 121 and 122 are reproductions of the signals provided by receiver coils 22, 23 and 24, respectively, each signal having a frequency of 1 kilohertz.

The signals from phase locked loop demodulators 120, 121 and 122 are provided to phase means 130 and 140 which provide a signal representative of the phase differences between the signals received by coils 23 and 24 and by coils 22 and 23, respectively.

Phase locked loop demodulators 120, 121 and 122 provide their output signals also to rectifier means 154, 154A, and 154B, respectively. The outputs of phase means 130 and 140 and rectifier means 154 and 154A are provided to an anlog input/output means 168. Analog input/output means 168 provides them as digital signals to microprocessor means 170. Analog input/output means 178 receives pulses from sheave wheel 150 and provides corresponding digital signals to microprocessor means 170 where depth shifting of data may be done if so desired. Microprocessor means 170 provides digital signals to analog input/output means 168, representative of the dielectric constant and of the resistivity of the earth formations, which in turn provides analog signals. The signals from rectifier means 154, 154A and 154B; from phase means 130 and 140; and from analog input/output means 168 are provided to amplifiers 155A, 155B, 155C, 155D, 155F, 155G and 155H; which amplifies the signals and provides them to recorder means 149.

Microprocessor means 170 performs the calculation of SFR and then uses this value together with the $\theta_L - \theta_M$ phase difference to calculate the dielectric constant value. The SFR is calculated in the following manner:

$$\text{SFR} = |\vec{H_M} - \vec{H_S}|/|\vec{H_M}| \tag{1}$$

where SFR is the magnitude of the secondary field ratio and $H_M$ and $H_S$ are the field strength values at the medium and short-spaced demodulator outputs. These signals are proportional to the original signals at the medium-spaced and short-spaced receiver coils, respectively. The field strength amplitudes are normally measured relative to their values in air. Thus equation (1) becomes:

$$\text{SFR} = [(\vec{H_M}/\vec{A_M}) - (\vec{H_S}/\vec{A_S})]/(\vec{H_M}/\vec{A_M}) \tag{2}$$

where $\vec{A_M}$ and $\vec{A_S}$ are the values of the electromagnetic field strength in air at the medium-spaced and short-spaced receiver coils, respectively. This can be reduced to the form:

$$\text{SFR} = |1 - (\vec{A_M}\vec{H_S}/\vec{A_S}\vec{H_M})| \tag{2}$$

Solving for the magnitude of (3) gives:

$$SFR = \sqrt{1 - 2F\cos(-P + 1°) + F^2} \tag{4}$$

where $F = \dfrac{|\vec{A_M}|}{|\vec{A_S}|} \cdot \dfrac{|\vec{H_S}|}{|\vec{H_M}|}$ and $P = \theta_M - \theta_S$.

The 1° phase angle results from the phase shift in air between the medium and short spaced receiver coils.

The microprocessor 170 is programmed to solve equation (4). The system is calibrated by placing sonde 11 in air and adjusting the $\theta_M - \theta_S$ phase value to 1° and the SFR to zero. In equation (4), this is accomplished by setting P=1 degree and F=1. The factor F is adjusted by varying the d.c. output of the rectifier means 154 in the short channel.

Microprocessor means 170 combines the SFR data calculated from the electromagnetic fields at the medium and short-spaced coils with the phase difference data measured between the long and medium-spaced coils. This is done by programming microprocessor means 170 to interpret the crossplot shown in FIG. 2. This crossplot relates the measured values of SFR and phase difference to the formation electrical parameters of resistivity and dielectric constant. The crossplot represents the solution of the Helmholtz wave equation in a cylindrical geometry for the coil spacings, frequency and borehole parameters chosen. The phase measurement is depth-shifted by microprocessor means 170 to align the two measure points vertically.

It should be noted that although the phase differences are derived from the total fields received by receiver coils 22, 23 and 24, the phase differences may be just as easily derived from the secondary fields of the total fields received by receiver coils 22, 23 and 24. There is no substantial difference in phase measurement between the two fields.

The present invention hereinbefore described is a resistivity and dielectric constant using secondary field ratio measurement as well as a phase shift measurement.

What is claimed is:

1. A well logging system for determining the dielectric constant and/or resistivity of earth formations, some of which have been invaded by drilling fluid, traversed by a borehole comprising:
   a well logging sonde adapted to be passed through the borehole including:
   means for transmitting electromagnetic energy into the earth formation at a frequency which enables the electromagnetic energy to propagate throughout the surrounding earth formation,
   first receiver means located a first predetermined distance from said transmitting means for receiving electromagnetic energy from the earth formation and providing a first receiver signal representative of the total electromagnetic field at that location,
   second receiver means located a second predetermined distance from said transmitting means for receiving electromagnetic energy from the earth formations and providing a second receiver signal representative of the total electromagnetic field at that location, where said second predetermined distance is greater than said first predetermined distance,
   third receiver means located a third predetermined distance from said transmitting means for receiving electromagnetic energy from the earth formations and providing a third receiver signal representative of the total electromagnetic field at that location,
   where said third predetermined distance is greater than said second predetermined distance, and
   means connected to the three receiver means for processing the three receiver signals to provide a combined signal for application to well logging cable means,
   well logging cable means connected to said signal processing means for conducting the combined signal from said signal processing means out of the borehole; and
   surface electronics including
   indication means connected to the well logging cable means for providing an indication of the dielectric constant and/or the resistivity of the earth formation in accordance with portions of said combined signal conducted by said cable means representative of secondary electromagnetic fields at two of the three receiving means locations.

2. A well logging system as described in claim 1 in which the indication means includes:
   means connected to the cable means for deriving the three receiver signals from the signal conducted by the cable means,
   means for deriving the phase difference between portions of the second receiver signal and the third receiver signal representative of secondary electromagnetic fields at the locations of the second and third receiver means,
   means for deriving the phase difference between portions of the first receiver signal and the second receiver signal representative of secondary electromagnetic fields at the locations of the first and second receiving means.

3. A well logging system as described in claim 2 in which the surface electronics includes:
   means for deriving an amplitude ratio in accordance with the portions of the first and second receiver signals representative of secondary electromagnetic fields at the locations of the first and second receiving means.

4. A well logging system for determining the dielectric constant and/or resistivity of earth formations, some of which have been invaded by drilling fluid, traversed by a borehole comprising:
   a well logging sonde adapted to be passed through the borehole including
   means for transmitting electromagnetic energy into the earth formation at a frequency which enables the electromagnetic energy to propagate throughout the surrounding earth formation,
   first receiver means located a first predetermined distance from said transmitting means for receiving electromagnetic energy from the earth formations and providing a first receiver signal representative of the total electromagnetic field at that location,
   second receiver means located a second predetermined distance from said transmitting means for receiving electromagnetic energy from the earth formations and providing a second receiver signal representative of the total electromagnetic field at that location, where said second predetermined distance is greater than said first predetermined distance,
   third receiver means located a third predetermined distance from said transmitting means for receiving electromagnetic energy from the earth formations and providing a third receiver signal representative of the total electromagnetic field at that location, where said third predetermined distance is greater than said second predetermined distance, and means connected to the three receiver means for processing the three receiver signals to provide a combined signal for application to well logging cable means, well logging cable means connected to said signal processing means for conducting the combined signal representative of the receiver signals from said signal processing means out of the borehole; and surface electronics including indication means connected to the well logging cable means for providing an indication of the dielectric constant and/or the resistivity of the earth formation in accordance with portions of said combined signal conducted by said cable means representative of secondary electromagnetic fields at the three receiving means locations.

5. A well logging system as described in claim 4 in which the indication means includes:

means connected to the cable means for deriving the three receiver signals from the signal conducted by the cable means, means for deriving the phase difference between portions of the second receiver signal and the third receiver signal representative of secondary electromagnetic fields at the locations of the second and third receiving means, means for deriving the phase difference between portions of the first receiver signal and the second receiver signal representative of secondary electromagnetic fields at the locations of the first and second receiving means.

6. A well logging system as described in claim 5 in which the surface electronics includes:

means for deriving an amplitude ratio in accordance with the portions of the first and second receiver signals representative of secondary electromagnetic fields at the locations of the first and second receiving means.

* * * * *